US012560534B2

(12) United States Patent
Civitci et al.

(10) Patent No.: US 12,560,534 B2
(45) Date of Patent: Feb. 24, 2026

(54) ELECTRONIC DEVICES WITH RELATIVE HUMIDITY SENSORS

(71) Applicant: Apple Inc., Cupertino, CA (US)

(72) Inventors: Fehmi Civitci, Carlsbad, CA (US); David D Dashevsky, San Jose, CA (US); Christopher M Dodson, Denver, CO (US); Kenneth J Vampola, Los Altos, CA (US); Mark T Winkler, Menlo Park, CA (US); Dawei Lu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 18/752,306

(22) Filed: Jun. 24, 2024

(65) Prior Publication Data

US 2025/0102425 A1     Mar. 27, 2025

Related U.S. Application Data

(60) Provisional application No. 63/585,823, filed on Sep. 27, 2023.

(51) Int. Cl.
G01N 21/31 (2006.01)

(52) U.S. Cl.
CPC ...  G01N 21/31 (2013.01); *G01N 2201/06113* (2013.01); *G01N 2201/0634* (2013.01); *G01N 2201/0636* (2013.01)

(58) Field of Classification Search
CPC .. G01N 21/552; G01N 21/81; G01N 21/7703; G01N 21/41; G01N 21/80; G01N 2021/7723; G01N 21/783; G01N 2021/435; G01N 21/6486; G01N 2201/062; G01N 2021/7726; G01N 2021/773;

(Continued)

(56) References Cited

U.S. PATENT DOCUMENTS

| | | | |
|---|---|---|---|
| 9,383,317 B2 * | 7/2016 | Zeun | .................. G01N 21/6428 |
| 11,256,217 B2 | 2/2022 | Tortora | |

(Continued)

FOREIGN PATENT DOCUMENTS

| | | | | |
|---|---|---|---|---|
| CN | 208383711 U | | 1/2019 | |
| CN | 113281303 A | * | 8/2021 | ............. G01N 21/45 |

(Continued)

*Primary Examiner* — Michael P Stafira
(74) *Attorney, Agent, or Firm* — Treyz Law Group, P.C.; David K. Cole

(57) ABSTRACT

An electronic device may include a housing and relative humidity sensor in the housing. The relative humidity sensor may include an optical layer, a relative humidity-sensitive layer coupled to a surface of the optical layer, a light emitter that emits light into the optical layer, and a light detector that detects light that has reflected within the optical layer and off of the relative humidity-sensitive layer. The relative humidity may be determined based on the light detected by the light detector. The optical layer may be a layer with angled edges, a prism, a Bragg reflector, or a waveguide. A reference light detector and/or a temperature sensor may be included in the relative humidity sensor, and measurements from these additional sensors may be used in determining the relative humidity. In this way, an optical relative humidity sensor may be formed in the electronic device.

20 Claims, 11 Drawing Sheets

(58) Field of Classification Search
CPC .......... G01N 21/4738; G01N 21/8507; G01N 2201/0221; G01N 2201/0621; G01N 29/14; G01N 2021/7773; G01N 2021/7776; G01N 2021/7783; G01N 2021/7786; G01N 21/3554; G01N 21/648; G01N 21/77; G01N 21/7746; G01N 2291/2636; G01N 27/902; G01N 29/225; G01N 29/265; G01N 33/54373; G01N 2021/8535; G01N 21/65; G01N 21/774; G01N 21/7743; G01N 21/83; G01N 2291/0237; G01N 2291/0238; G01N 2291/02845; G01N 29/036; G01N 29/2418; G01N 33/0098; G01N 2021/1712; G01N 2021/1721; G01N 2021/1725; G01N 2021/3595; G01N 2021/7713; G01N 21/1702; G01N 21/171; G01N 21/1717; G01N 21/274; G01N 21/31; G01N 21/33; G01N 21/3563; G01N 21/4133; G01N 21/45; G01N 21/47; G01N 21/55; G01N 21/636; G01N 21/75; G01N 21/78; G01N 2201/0696; G01N 25/68; G01N 33/4833; G01N 33/49; G01N 33/66; G01N 2021/7706; G01N 2021/7759; G01N 2021/7779; G01N 2021/8528; G01N 2021/8542; G01N 2021/8585; G01N 2021/8663; G01N 21/01; G01N 21/25; G01N 21/27; G01N 21/43; G01N 21/59; G01N 21/63; G01N 21/64; G01N 21/6428; G01N 21/8483; G01N 21/85; G01N 21/88; G01N 21/9501; G01N 21/9505; G01N 2201/06113; G01N 2201/1211; G01N 2291/0235; G01N 2291/02483; G01N 2291/0253; G01N 2291/0422; G01N 2291/0427; G01N 23/20; G01N 27/605; G01N 29/032; G01N 29/11; G01N 29/2481; G01N 29/348; G01N 33/14; G01N 33/225; G01N 33/24; G01N 33/245; G01N 33/493; G01N 33/54366; G01N 35/0099; G01N 2021/157; G01N 2021/6419; G01N 2021/6441; G01N 2021/6478; G01N 2021/945; G01N 2021/9586; G01N 21/412; G01N 21/431; G01N 21/6447; G01N 21/645; G01N 21/6452; G01N 21/6454; G01N 21/94; G01N 21/958; G01N 2201/02; G01N 2201/0231; G01N 2201/0612; G01N 2201/0634; G01N 2201/0636; G01N 2201/068; G01N 2201/08; G01N 2201/125; G01N 33/02; G01N 33/542
See application file for complete search history.

(56) References Cited

U.S. PATENT DOCUMENTS

| | | | |
|---|---|---|---|
| 11,371,953 B2 | 6/2022 | Chowdhury et al. | |
| 11,490,852 B1 | 11/2022 | Kurani et al. | |
| 11,626,001 B1 * | 4/2023 | Khmelev | G08B 21/12 |
| | | | 340/532 |
| 2002/0173922 A1 * | 11/2002 | Potyrailo | G01N 29/036 |
| | | | 702/39 |
| 2010/0307238 A1 | 12/2010 | Van Popta et al. | |
| 2014/0186215 A1 | 7/2014 | Shinta et al. | |
| 2019/0187464 A1 * | 6/2019 | Qin | H04N 23/51 |
| 2020/0237940 A1 * | 7/2020 | Yan | A61L 2/10 |
| 2021/0007604 A1 * | 1/2021 | Esser | A61B 5/6824 |
| 2022/0236484 A1 * | 7/2022 | Liu | G02B 6/12007 |

FOREIGN PATENT DOCUMENTS

| | | | | | |
|---|---|---|---|---|---|
| CN | 113884440 A | | 1/2022 | | |
| CN | 112986182 B | | 3/2023 | | |
| CN | 118169077 A | * | 6/2024 | | G01N 21/45 |
| DE | 112019005493 T5 | * | 10/2021 | | G01N 21/552 |
| EP | 3598246 A1 | * | 1/2020 | | G04B 47/06 |
| EP | 4230131 A1 | * | 8/2023 | | A61B 5/6843 |
| JP | 2002195939 A | * | 7/2020 | | B60S 1/084 |
| WO | 2010084523 A1 | | 7/2010 | | |
| WO | WO-2021105213 A1 | * | 6/2021 | | G01N 21/553 |

* cited by examiner

ELECTRONIC DEVICES WITH RELATIVE HUMIDITY SENSORS

This application claims the benefit of U.S. provisional patent application No. 63/585,823, filed Sep. 27, 2023, which is hereby incorporated by reference herein in its entirety.

FIELD

This relates generally to electronic devices, and, more particularly, to electronic devices with environmental sensors.

BACKGROUND

Electronic devices such as laptop computers, cellular telephones, and other equipment are sometimes provided with environmental sensors, such as ambient light sensors, image sensors, and microphones.

SUMMARY

An electronic device, such as a wristwatch device or other wearable electronic device, may include a housing and a display in the housing. The electronic device may also include a relative humidity sensor in the housing. For example, the housing may have an opening, and the relative humidity sensor may be overlapped by the opening to receive moisture from an exterior of the device.

The relative humidity sensor may include an optical layer, a relative humidity-sensitive layer coupled to a surface of the optical layer, a light emitter that emits light into the optical layer, and a light detector that detects light that has reflected within the optical layer and off of the relative humidity-sensitive layer. The relative humidity-sensitive layer may have a refractive index or other property that changes based on the relative humidity. Therefore, the relative humidity may be determined based on the light detected by the light detector.

The optical layer may be a layer with angled edges, a prism, a Bragg reflector, or a waveguide, as examples. A reference light detector and/or a temperature sensor may be included in the relative humidity sensor, and measurements from these additional sensors may also be used in determining the relative humidity. In this way, an optical relative humidity sensor may be formed in the electronic device.

DETAILED DESCRIPTION

Electronic devices are often carried by users as they conduct their daily activities. For example, a user may carry an electronic device on their person throughout the day while walking, commuting, working, exercising, etc. In some situations, it may be desirable for the user to know the relative humidity in the device's environment. For example, relative humidity may be used in combination with fitness applications (e.g., to determine whether a user is suffering from hypothermia, which is more likely at high relative humidity levels), weather sensing and/or forecasting, and/or or other desired functions.

To make relativity humidity measurements, the electronic device may include a relative humidity sensor. The relative humidity sensor may include a light source, an optical layer through which the light source emits light, a relative humidity-sensitive layer on the optical layer, and a light detector. The relative humidity-sensitive layer may alter the light prior to the light reaching the light detector. In particular, at different relative humidity levels, the relative humidity-sensitive coating may have different refractive indexes. Therefore, the relative humidity may be determined based on the amount/intensity of the light that reaches the light detector after it has reflected off of the relative humidity-sensitive layer.

Figure 1:
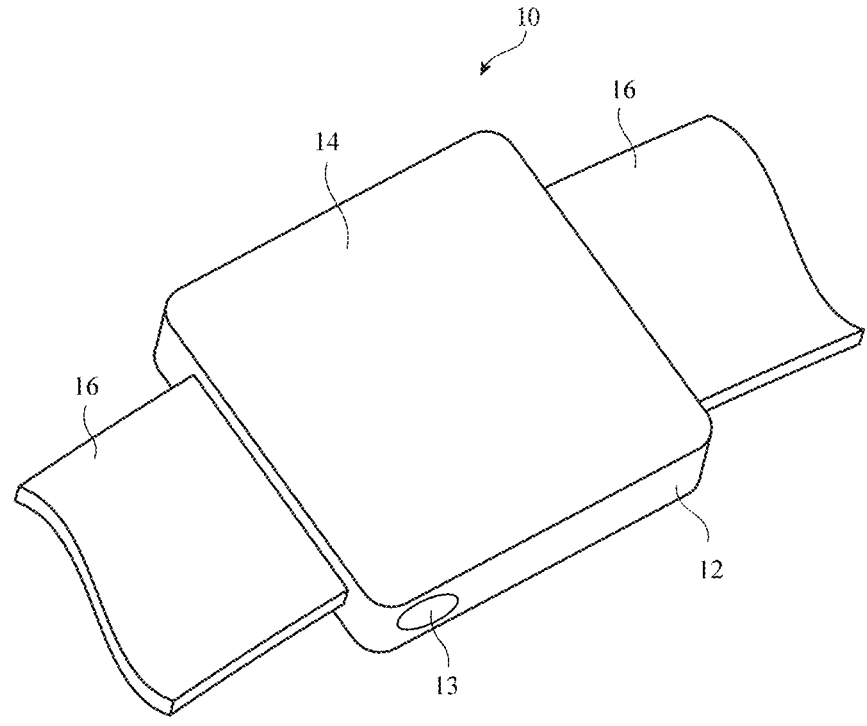
FIG. 1 is a perspective view of an illustrative wearable electronic device in accordance with some embodiments.

In general, any suitable electronic devices may include a relative humidity sensor. As shown in FIG. 1, a wearable electronic device 10, which may be a wristwatch device, may have a housing 12, a display 14, and a strap 16. In particular, display 14 may be on a front face of wearable device 10. The wristwatch may attach to a user's wrist via strap 16. When worn on the user's wrist, a rear face of wearable device 10 (i.e., a rear surface of housing 12) may contact or be oriented toward the user's wrist. In some embodiments, device 10 may include various sensors that are in contact with the user's wrist, and the sensors may gather health or activity data (e.g., heart rate data or blood oxygen data) of the user. Additionally or alternatively, device 10 may include opening 13. Opening 13 may allow moisture to pass through a wall of housing 12 (e.g., a sidewall of housing 12), allowing a relative humidity sensor that is overlapped by the opening to determine the relative humidity outside of device 10. Opening 13 may be covered with a mesh or other material, or may be uncovered.

Figure 2:
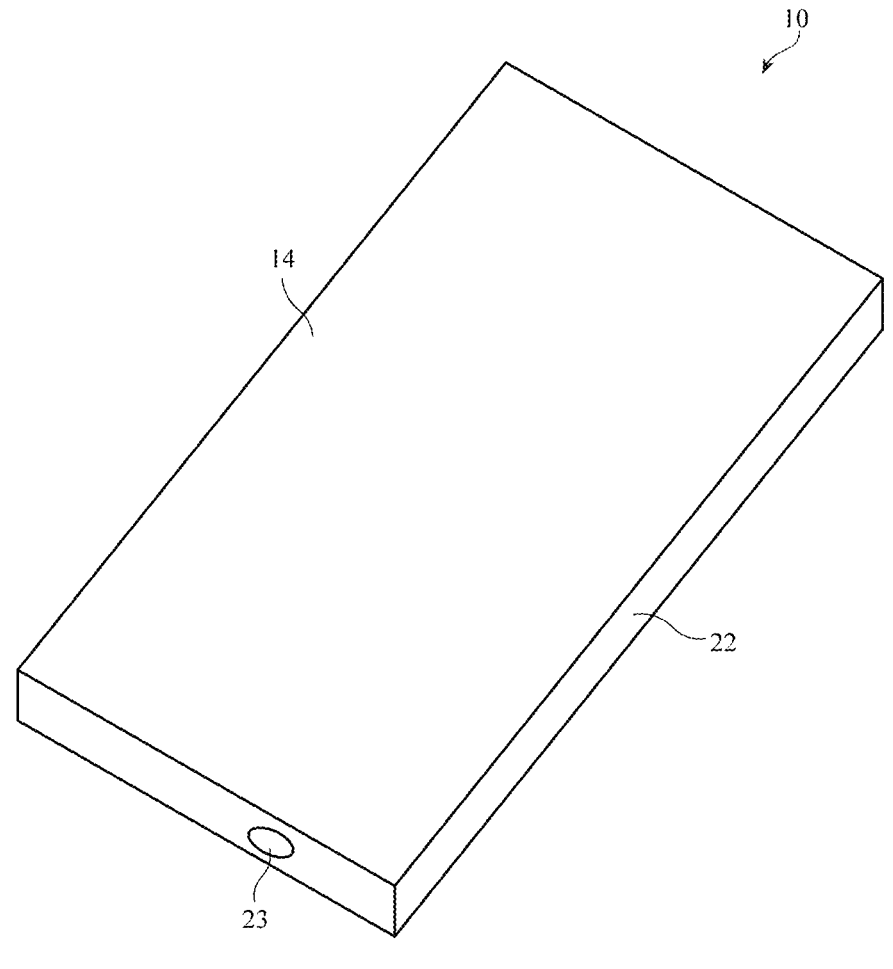
FIG. 2 is a perspective view of an illustrative portable electronic device in accordance with some embodiments.

Although FIG. 1 shows electronic device 10 shown as a wristwatch device, this is merely illustrative. In general, electronic device 10 may be any desired device. For example, in the illustrative example of FIG. 2, device 10 may be a cellular telephone (e.g., a smartphone) having display 14 on a front face of housing 22, as well as opening 23 for a relative humidity sensor on a sidewall of housing 22. Alternatively, device 10 may be a media player (e.g., a smart speaker), or other handheld or portable electronic device, a laptop computer, a desktop computer, a wristband device, a pendant device, a headphone, a speaker, an ear bud or earpiece device, a head-mounted device such as glasses, goggles, a helmet, or other equipment worn on a user's head, or other wearable or miniature device, a navigation device, or other accessory, and/or equipment that implements the functionality of two or more of these devices.

Illustrative configurations in which electronic device 10 is a portable electronic device such as a cellular telephone, head-mounted device, ear bud, wristwatch, or portable computer may sometimes be described herein as examples. Regardless of the form factor of device 10, an illustrative schematic diagram of device 10 is shown in FIG. 3.

Figure 3:
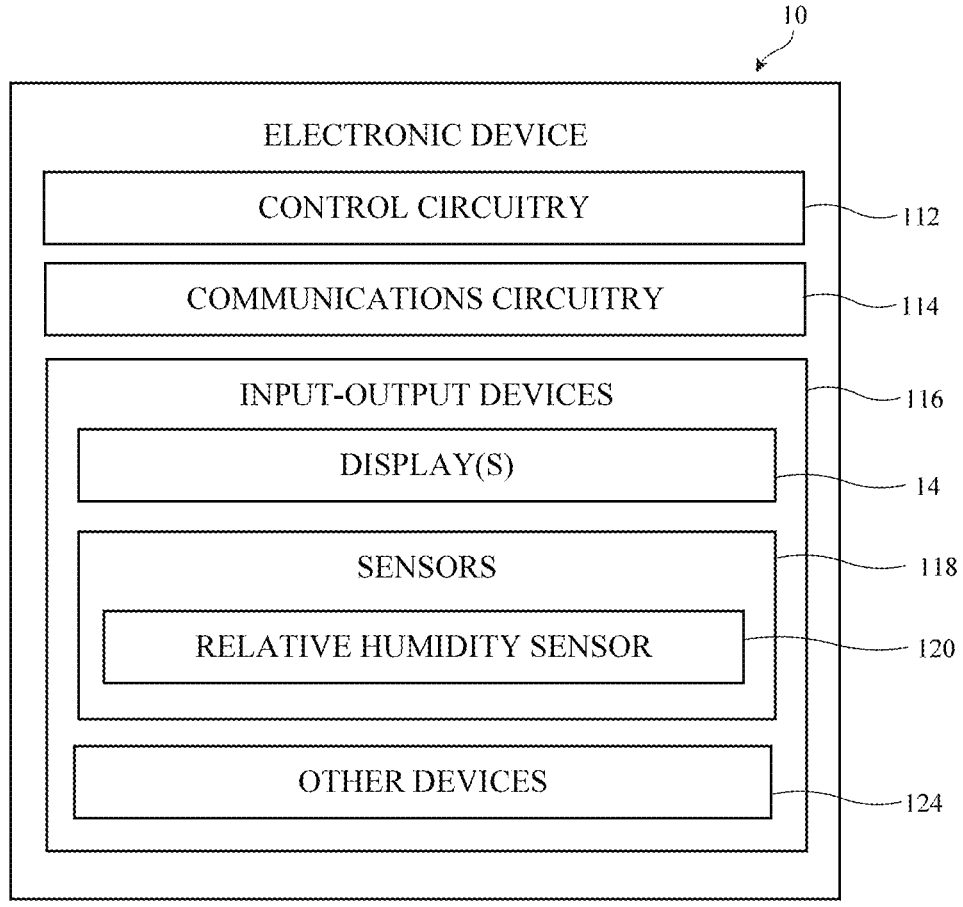
FIG. 3 is a diagram of an illustrative electronic device in accordance with some embodiments.

As shown in FIG. 3, electronic devices such as electronic device 10 may have control circuitry 112. Control circuitry 112 may include storage and processing circuitry for controlling the operation of device 10. Circuitry 112 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 112 may be based on one or more microprocessors, microcontrollers, digital signal processors, baseband processors, power management units, audio chips, graphics processing units, application specific integrated circuits, and other integrated circuits. Software code may be stored on storage in circuitry 112 and run on processing circuitry in circuitry 112 to implement control operations for device 10 (e.g., data gathering operations, operations involving the adjustment of the components of device 10 using control signals, etc.).

Electronic device 10 may include communications circuitry 114, which may include wired and/or wireless communications circuitry. For example, electronic device 10 may include radio-frequency transceiver circuitry, such as cellular telephone transceiver circuitry, wireless local area network transceiver circuitry (e.g., Wi-Fi® circuitry), short-range radio-frequency transceiver circuitry that communicates over short distances using ultra high frequency radio waves (e.g., Bluetooth® circuitry operating at 2.4 GHz or other short-range transceiver circuitry), millimeter wave transceiver circuitry, and/or other wireless communications circuitry.

Device 10 may include input-output devices 116. Input-output devices 116 may be used to allow a user to provide device 10 with user input. Input-output devices 116 may also be used to gather information on the environment in which device 10 is operating. Output components in devices 116 may allow device 10 to provide a user with output and may be used to communicate with external electrical equipment.

Input-output devices 116 may include one or more optional displays such as displays 14. Displays 14 may be organic light-emitting diode displays or other displays with light-emitting diodes, liquid crystal displays, microLED displays, or other displays. Displays 14 may be touch sensitive (e.g., displays 14 may include two-dimensional touch sensors for capturing touch input from a user) and/or displays 14 may be insensitive to touch.

Input-output devices 116 may include sensors 118. Sensors 118 may include, for example, temperature sensors (e.g., thermistors or thermocouples), three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors (e.g., a magnetometer), audio sensors (microphones), ambient light sensors, microphones for gathering voice commands and other audio input, sensors that are configured to gather information on motion, position, and/or orientation (e.g., accelerometers, gyroscopes, pressure sensors, compasses, and/or inertial measurement units that include all of these sensors or a subset of one or two of these sensors), health sensors that measure various biometric information (e.g., heartrate sensors, such as a photoplethysmography sensor), electrocardiogram sensors, and perspiration sensors) and/or other sensors.

Sensors 118 may also include one or more relative humidity sensors 120. Relative humidity sensor(s) 120 may be incorporated into device 10, and may measure a relative humidity of the environment at the exterior of electronic device 10.

If desired, input-output devices 116 may include other devices 124 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Figure 4:
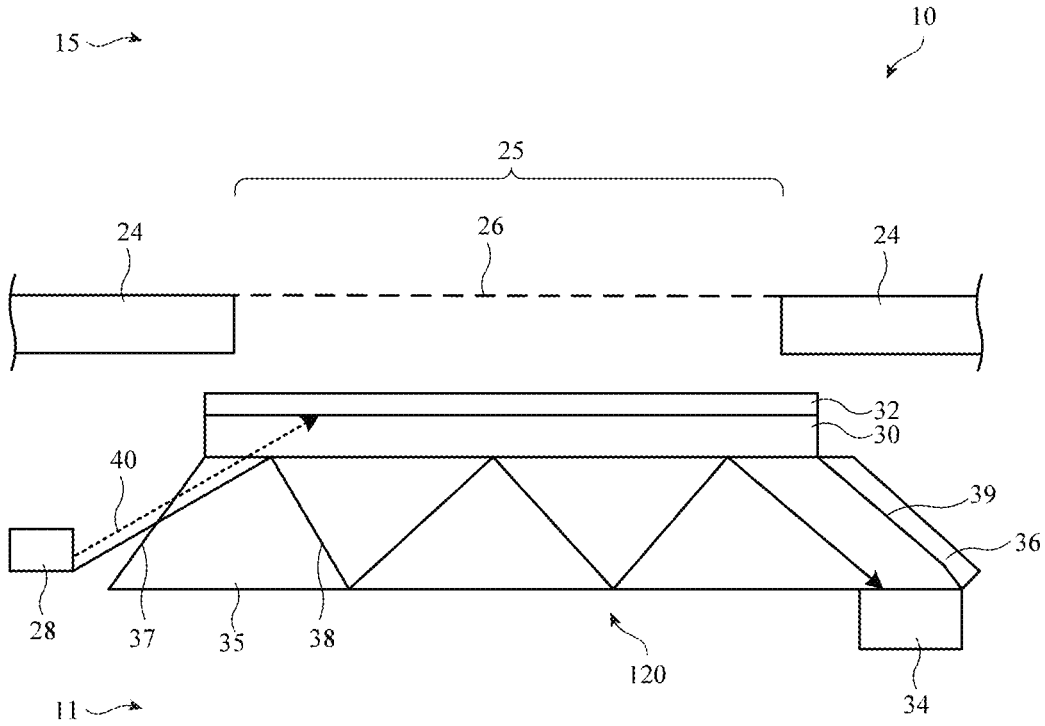
FIG. 4 is a side view of an illustrative electronic device with a relative humidity sensor in accordance with some embodiments.

An illustrative example of a device having a relative humidity sensor is shown in FIG. 4. As shown in FIG. 4, device 10 may include relative humidity sensor 120. In particular, relative humidity sensor 120 may be positioned behind opening 25 of layer 24. Layer 24 may be a housing of device 10, such as housing 12 of FIG. 1 or housing 22 of FIG. 2. Alternatively, layer 24 may be another layer that overlaps relative humidity sensor 120 and separates interior 11 from exterior 15. Opening 25, which may correspond with opening 13 of FIG. 1 or opening 23 of FIG. 2, may allow moisture from the environment at exterior 15 to reach relative humidity sensor 120 in interior 11. Opening 25 may overlap sensor 120, as shown in FIG. 4, or sensor 120 may be partially or entirely offset from opening 25. In other words, relative humidity sensor 120 may be in interior 11 and may be exposed to the environment at exterior 15. Protective mesh 26 may be included in opening 25 to protect relative humidity sensor 120 and/or other components in interior 11 from various particulate or other intrusive materials. Protective mesh 26 may be a metal mesh, a polymer mesh, or a mesh of any other suitable material. In some embodiments, protective mesh 26 may be coated with a hydrophobic material to protect sensor 120 from liquid water, while still allowing sensor 120 to react to relative humidity changes in exterior 15.

Relative humidity sensor 120 may include light emitter 28 (also referred to as light source 28 herein), which may be a laser diode, a light-emitting diode, or any other desired light emitter. Sensor 120 may also include optical layer 35, which may be formed from glass, polymer (e.g., polycarbonate), sapphire, ceramic, or other suitable material. Optical layer 35 may have angled edges 37 and 39 (also referred to as beveled and/or faceted edges 37 and 39 herein). In some embodiments, optical layer 35 may be an optical film.

Light detector 34, which may be a photodiode or other light-sensitive device, may be included within sensor 120 at an opposite end from light emitter 28. Mirror coating 36 may be formed on angled edge 39 and may reflect light to light detector 34. Mirror coating 36 may be formed from a reflective material, such as metal; a reflective coating, such as a stack of thin-film dielectric layers that have a reflectivity of at least 75%, at least 80%, at least 90% or other suitable reflectivity; or other suitable reflective material.

Relative humidity-sensitive layer 30 (also referred to relative humidity-sensitive material 30 herein) may be formed on a surface of optical layer 35, and absorptive coating 32 may be formed on relative humidity-sensitive layer 30. Relative humidity-sensitive layer 30 may be an inorganic porous film, which may include voids and/or nanoparticles. Layer 30 may have a thickness of at least 1 micron, between 1 micron and 100 microns, less than 150 microns, at least 50 microns, or other suitable thickness. The nanoparticles may be inorganic, such as metal oxide nanoparticles. As some illustrative examples, the nanoparticles may include silicon dioxide nanoparticles, titanium dioxide nanoparticles, zinc oxide nanoparticles, or other suitable nanoparticles. The nanoparticles and/or voids in layer 30 may exhibit changes, such as refractive index changes, at different relative humidities, therefore impacting light that reflects off of layer 30.

Alternatively, relative humidity-sensitive layer 30 may be formed from a holographic layer. For example, relative humidity-sensitive layer 30 may be formed from a photopolymer, such as dichromate gelatin, in or on which a holographic pattern is recorded. The holographic pattern may be an interference pattern that includes a plurality of gratings and/or may include lenses or mirrors. The photopolymer may be sensitive to relative humidity and/or temperature, and may have a refractive index change or a thickness change at different relative humidities. When exposed to different relative humidity levels, the holographic interference pattern (e.g., the distance between gratings of the interference pattern) may therefore change, impacting the reflection of light off of relative humidity-sensitive layer 30.

Absorptive coating 32 may be a black coating (e.g., black ink or black frit), a thin-film interference filter coating with at least 50%, at least 75%, at least 80%, or at least 90% absorption, as examples, or any other suitable absorptive coating. Mirror coating 36 may optionally be included on a surface of optical layer 35 opposing light source 28.

In operation, light source 28 may emit light 38 into optical layer 35 through angled edge 37. Light 38 may reflect within optical layer 35 and off of relative humidity-sensitive layer 30 until it is detected by light detector 34. Mirror coating 36 may reflect light that reaches beveled edge 39 toward light detector 34. However, the presence of relative humidity-sensitive layer 30 may impact the amount of light that reaches light detector 34.

In particular, at low relative humidity, the refractive index of relative humidity-sensitive layer 30 may be between the refractive index of air outside of device 10 (e.g., a refractive index of approximately 1.0) and the refractive index of the nanoparticles within layer 30 due to presence of the voids within layer 30. Therefore, at low relative humidity levels, a high percentage of light 38 will reflect within optical layer 35 and reach light detector 34.

However, as the relative humidity increases, water may build up on the surface of the nanoparticles and/or fill the voids in layer 30. The presence of the water may therefore increase the refractive index of layer 30, redirecting some light 40 through layer 30 to be absorbed by absorptive coating 32. Therefore, a lower percentage of light 38 will reach light detector 34 at high relative humidity levels.

In an illustrative embodiment in which a sol-gel coated silicon dioxide porous film is used for layer 30, the refractive index of relative humidity-sensitive layer 30 may change from 1.38 to 1.43 as the relative humidity changes from 30% to 90%. However, this is merely illustrative. In general, the refractive index of layer 30 may change as a function of the relative humidity based on the material(s) that form layer 30.

As a result of the refractive index changes, more of light 40 will pass through relative humidity-sensitive layer 30 and be absorbed by absorptive coating 32. The amount of light 40 that is absorbed by absorptive coating 32 increases as the relative humidity increases, and the amount of light that reaches light detector 34 decreases as the relative humidity increases. Therefore, the relative humidity may be determined by determining the amount of light that reaches light detector 34. An illustrative example of a relationship between the amount of light detected by a light detector in relative humidity sensor and the relative humidity is shown in FIG. 5.

Figure 5:
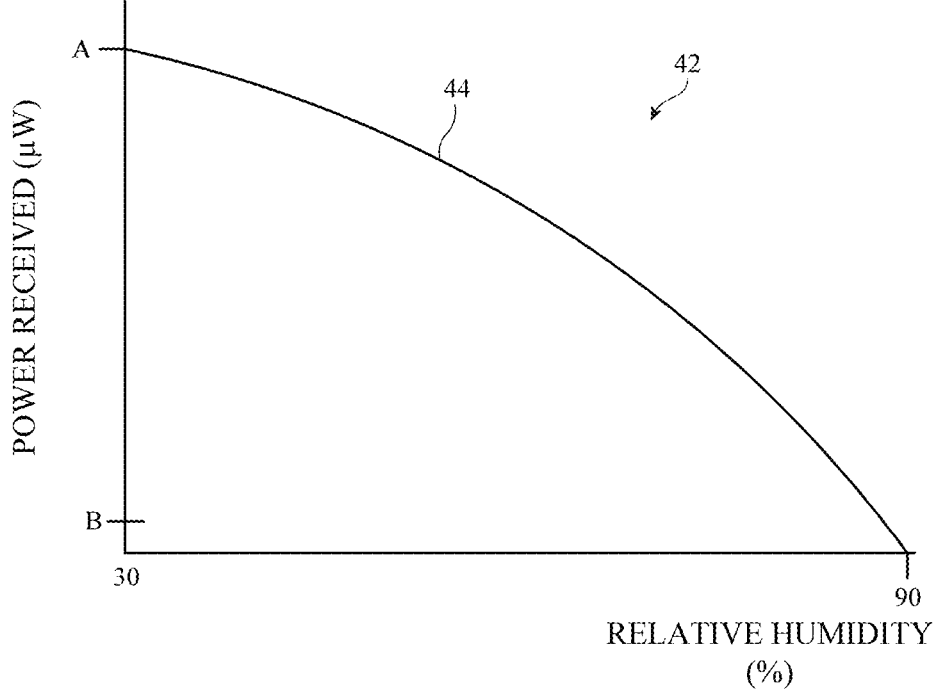
FIG. 5 is a graph of an illustrative relationship between relative humidity and power received by a light detector in a relative humidity sensor in accordance with some embodiments.

As shown in FIG. 5, graph 42 may include illustrative relationship 44 between the relative humidity and the power measured by a light detector (e.g., light detector 34 of FIG. 4) in a relative humidity sensor (e.g., relative humidity sensor 120 of FIG. 4). In particular, as shown in FIG. 5, a high power A may be detected by the light detector at a relative humidity of 30%. In contrast, a low power B may be detected by the light detector at a relative humidity of 90%. As examples, power A may be at least 175 µW, at least 190 µW, or another high power value, while power B may be less than 150 µW, less than 160 µW, or another low power value. However, these examples are merely illustrative. In general, high power A and low power B will change depending on the power emitted by the light source in a relative humidity sensor (e.g., light source 28 of FIG. 4).

The relationship between relative humidity and power for a given relative humidity sensor may be determined by calibrating the relative humidity sensor using at least two different relative humidity conditions, as an example. In operation, the known relationship between relative humidity and power (e.g., the illustrative relationship 44 of FIG. 5) may be used to determine the relative humidity based on a power measurement from a light detector. For example, processing circuitry within sensor 120 and/or control circuitry (such as control circuitry 112 of FIG. 3) may be used to determine the relative humidity based on the power measurements from the light detector. In this way, an optical relative humidity sensor, such as relative humidity sensor 120 of FIG. 4, may be used to measure the relative humidity in a device's environment.

In the example of FIG. 5, the relationship between power received and relative humidity is shown between 30% and 90%. However, this is merely an illustrative relationship across an illustrative range of relative humidity levels. In general, depending on the relative humidity-sensitive material used in a relative humidity sensor, the relative humidity-sensitive material may detect relative humidity changes across any suitable range of relative humidity levels.

Although FIG. 4 shows light emitter 28 and light detector 34 on opposite sides of sensor 120, this arrangement is merely illustrative. In some embodiments, a light emitter and light detector may be incorporated on the same side of a relative humidity sensor. An illustrative example is shown in FIG. 6.

Figure 6:
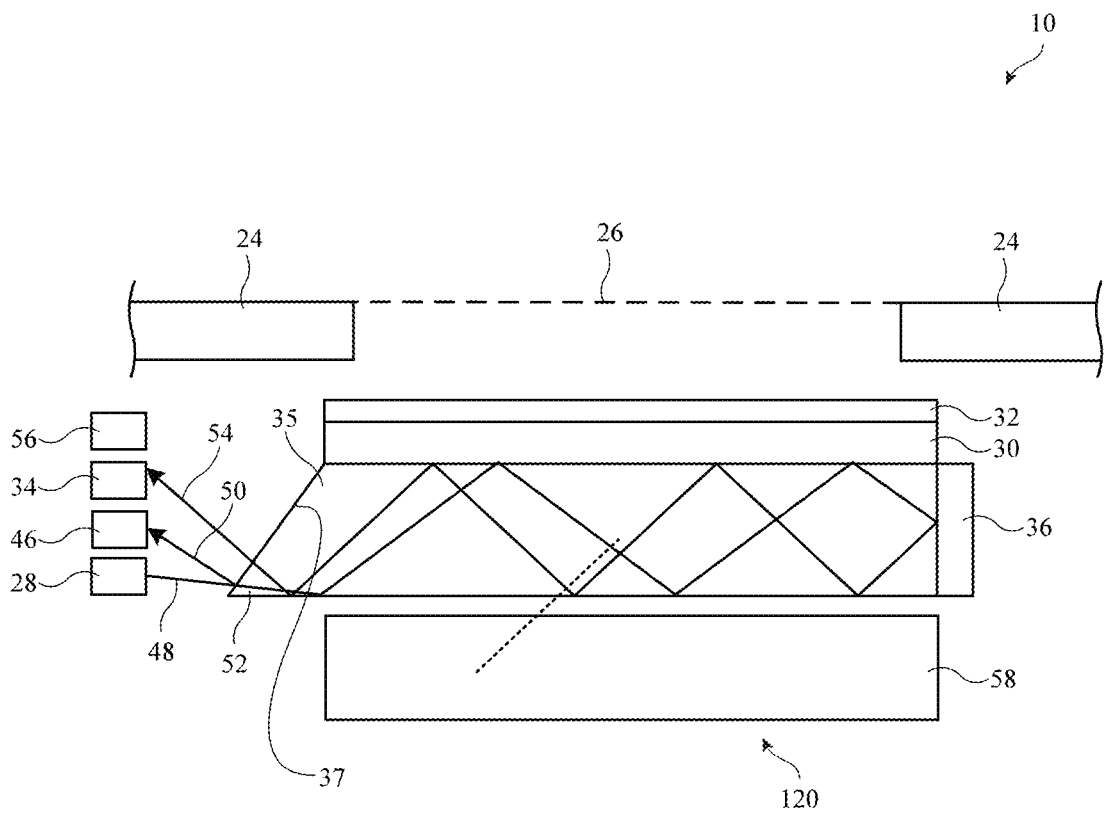
FIG. 6 is a side view of an illustrative electronic device with a relative humidity sensor having a light emitter and a light detector on the same side of an optical layer in accordance with some embodiments.

As shown in FIG. 6, light emitter 28 and light detector 34 may be included on the same side of sensor 120. In operation, light emitter 28 may emit light 52 into optical layer 35. When light 52 reaches the opposing side of optical layer 35, the light may be reflected by mirror coating 36. Light 52 may then be reflected back through optical layer 35 and reach light detector 34 as light 54. The power of light 54 that reaches light detector 34 may be related to the relative humidity, as the refractive index of relative humidity-sensitive material 30 may change based on the relative humidity, allowing more light to pass through to absorptive coating 32 as the relative humidity increases (e.g., as in the example of FIG. 4). By measuring light 54 (e.g., the power of light 54) using light detector 34, the relative humidity may therefore be determined. In other words, relative humidity sensor 120 may determine the relative humidity directly based on the measurement of light 54, or control circuitry (such as control circuitry 112 of FIG. 3) may be used to determine the relative humidity based on the measurement of light 54.

By incorporating light emitter 28 and light detector 34 on the same side of optical layer 35, the path of light 52 through optical layer 35 may be doubled (e.g., as compared to FIG. 4, where light emitter 28 and light detector 34 are on opposite sides of optical layer 35), which may increase the sensitivity of sensor 120 if optical layer 35 is maintained at the same length. Alternatively, the length of optical layer 35 may be decreased, and space may be saved in device 10. Additionally or alternatively, light emitter 28 and light detector 34 may be mounted on the same control board (e.g., a printed circuit board), which may save additional space in device 10.

In addition to incorporating light emitter 28 and light detector 34 on the same side of optical layer 35, sensor 120 may optionally include reference light detector 46 and temperature sensor 56. Reference light detector 46, which may be a photodiode or other light-sensitive component, may detect light 50 that is emitted by light emitter 28 and reflected by angled edge 37 prior to the rest of light 48 entering optical layer 35. By measuring light 50, light intensity fluctuations (e.g., light fluctuations of light emitter 28 or fluctuations of ambient light) may be detected and corrected. Additionally or alternatively, temperature sensor 56, which may be a thermistor or thermocouple, may measure the temperature near relative humidity-sensitive material 30. Because the refractive index of relative humidity-sensitive material 30 may change in response to changes in temperature, as well as the changes in relative humidity, changes that occur due to temperature changes may be corrected for based on the temperature measurements by temperature sensor 56.

Although temperature sensor 56 is shown as being adjacent to light detector 34, this is merely illustrative. In general, temperature sensor 56 may be formed in any suitable location in relative humidity sensor 120. For example, temperature sensor 56 may be formed near relative humidity-sensitive layer 30, adjacent to relative humidity-sensitive layer 30, in contact with relative humidity-sensitive layer 30, or otherwise close to layer 30 to determine temperature changes of layer 30. Alternatively or additionally, multiple temperature sensors 56 may be incorporated into sensor 120.

Sensor 120 may also optionally include heater 58. Heater 58 may be, as an example, as resistive heating element that may be heated to evaporate moisture from relative humidity-sensitive layer 30 if device 10 has been subject to high humidity or soaking. Alternatively or additionally, in some embodiments, heater 58 may dry relative humidity-sensitive layer 30 between relative humidity measurements. Heater 58 may dry layer 30 between each relative humidity measurement or between selected relative humidity measurements. In other words, heater 58 may ensure that relative humidity-sensitive layer 30 returns to a refractive index state that reflects the current relative humidity at the exterior of device 10.

However, the addition of reference light detector 46, temperature sensor 56, and/or heater 58 in FIG. 6 (as opposed to the arrangement of FIG. 4) are merely illustrative. In general, any of reference light detector 46, temperature sensor 56, and/or heater 58 may be omitted from sensor 120 of FIG. 6. Additionally or alternatively, any of reference light detector 46, temperature sensor 56, and/or heater 58 may be incorporated into sensor 120 of FIG. 4.

In the examples of FIGS. 4 and 6, light emitted by light emitter 28 travels through optical layer 35 having angled edges prior to reaching light detector 34. However, the use of optical layer 35 in FIGS. 4 and 6 is merely illustrative. In some embodiments, other layers may be used to form an optical layer. An illustrative example in which a Bragg reflector is used is shown in FIG. 7.

Figure 7:
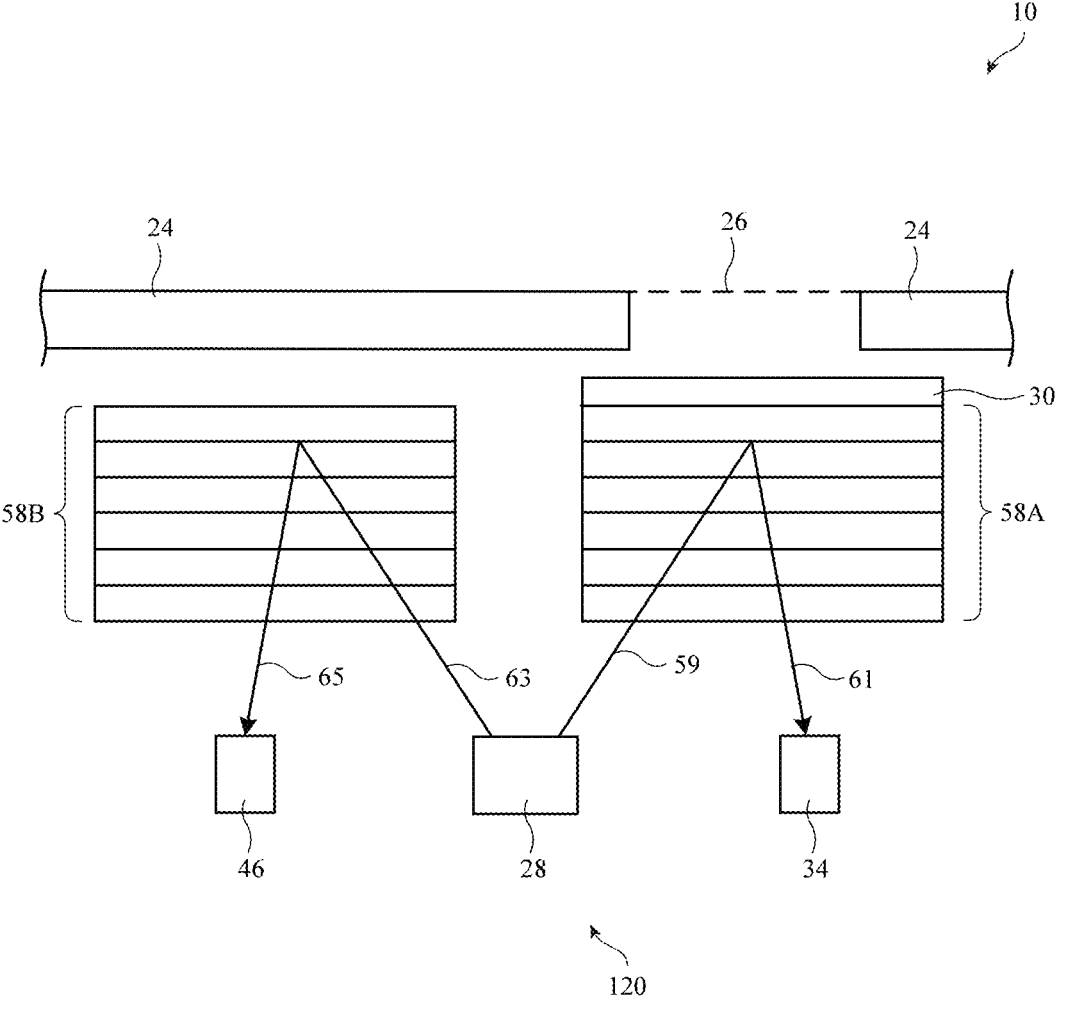
FIG. 7 is a side view of an illustrative electronic device with a relative humidity sensor formed from Bragg reflectors in accordance with some embodiments.

As shown in FIG. 7, relative humidity sensor 120 may include Bragg reflectors 58A and 58B as optical layers. Bragg reflectors 58A and 58B may include stacks of thin-film dielectric layers having alternating high and low refractive indexes. These thin-film dielectric layers may destructively interfere with light incident on Bragg reflectors 58A and 58B, and Bragg reflectors 58A and 58B may therefore reflect light based on its wavelength. Relative humidity-sensitive layer 30 may be included on a top surface of Bragg reflector 58A, while Bragg reflector 58B may not be coated with layer 30.

Light emitter 28 may emit light 59 toward Bragg reflector 58A, which in turn may reflect the light as light 61. Light 61 may be detected by light detector 34. At the same time, light emitter 28 may emit light 63 toward reference Bragg reflector 58B, which in turn may reflect the light as light 65. Light 65 may be detected by reference light detector 46.

Due to the presence of relative humidity-sensitive layer 30 on Bragg reflector 58A, light detector 34 may detect a different amount of light than reference light detector 46, despite light 59 and 63 having the same wavelength and power when emitted by light emitter 28. The difference between the measurements taken by light detector 34 and reference light detector 46 may correspond with the refractive index of relative humidity-sensitive material 30 and therefore to the relative humidity (as discussed in connection with FIGS. 4-6). In particular, the relative humidity may be determined based on the measurements of light detector 34 and reference light detector 46, such as by comparing the measurement from light detector 34 to the measurement from reference light detector 46. In other words, relative humidity sensor 120 may determine the relative humidity directly based on the measurements of light detector 34 and reference light detector 46, or control circuitry (such as control circuitry 112 of FIG. 3) may be used to determine the relative humidity based on the measurements of light detector 34 and reference light detector 46.

Bragg reflectors 58A and 58B may be designed to reflect light of a desired wavelength (e.g., a wavelength that corresponds with the light emitted by light emitter 28) and may be sensitive to refractive index changes around that wavelength. A graph of an illustrative relationship between wavelength and reflectance of a Bragg reflector is shown in FIG. 8.

Figure 8:
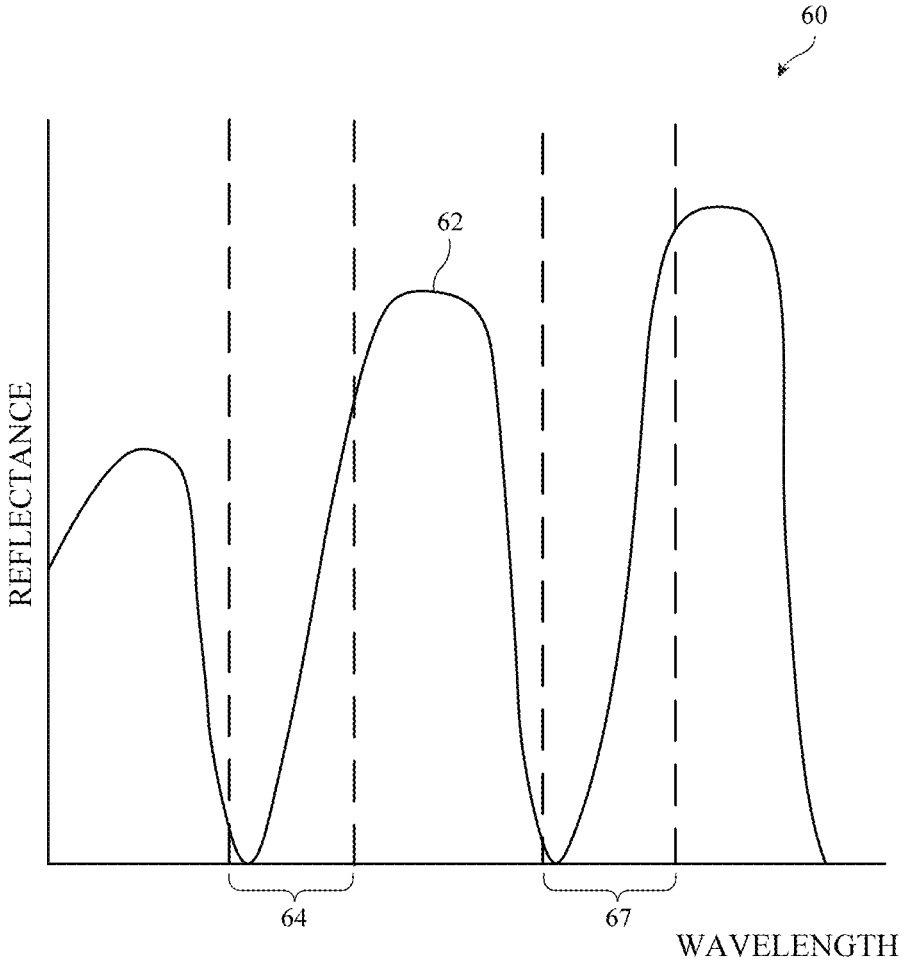
FIG. 8 is a graph of an illustrative relationship between wavelength and reflectance for a Bragg reflector in accordance with some embodiments.

As shown in FIG. 8, graph 60 may include illustrative relationship 62 between wavelength and reflectance for a Bragg reflector, such as Bragg reflectors 58A and 58B of FIG. 7. As shown by illustrative relationship 62, the Bragg reflector may have peaks and valleys in reflectance across different wavelengths of light incident on the Bragg reflector. In regions between the peaks and valleys, the Bragg reflector may have very sensitive responses to changes in wavelength. In particular, across wavelength ranges 64 and 67, the Bragg reflector may have a large change in reflectance with a small change in the wavelength of incident light.

Therefore, Bragg reflectors in a relative humidity sensor may be designed to have a wavelength range 64 and/or 67 at a suitable value, such as at approximately 880 nm, between 870 and 900 nm, between 800 and 840 nm, or other suitable values, and a light emitter in the sensor (e.g., light emitter 28) may emit light within wavelength range 64 or 67. Therefore, any change to the refractive index of relative humidity-sensitive material 30 overlapping Bragg reflector 58A may have a large effect on the reflectance of light off of Bragg reflector 58A. By comparing the light sensed by light detector 34 and the light sensed by light detector 46, the change in the refractive index of relative humidity-sensitive material 30 may be determined, and the relative humidity may be determined based on the refractive index change. In this way, relative humidity sensor 120 of FIG. 7 may be used to determine the relative humidity.

Although FIG. 7 shows using a single light source that emits light toward two Bragg reflectors, this arrangement is merely illustrative. In some embodiments, two light sources with different wavelengths may be used with a single Bragg reflector (or multiple Bragg reflectors) and one light detector. For example, one light source may emit light at a wavelength in wavelength range 64, while the other light source may emit light at a wavelength in wavelength range 67. The ratio of light reflected by the Bragg reflector (with relative humidity-sensitive material 30 overlapping the Bragg reflector) at the two wavelengths may be taken (e.g., the reflected light at the two wavelengths may be compared) and used to determine the refractive index of relative humidity-sensitive material 30 and therefore the relative humidity. This approach may have a higher resolution than the arrangement shown in FIG. 7, for example.

As another alternative, a single light source may emit light at a single Bragg reflector (with relative humidity-sensitive material 30 overlapping the Bragg reflector). Multiple light detectors that are sensitive to different wavelengths (e.g., light detectors with different color filters) may detect the reflected light. Based on the reflected light at the different wavelengths, such as by comparing the reflected light at the different wavelengths, the refractive index of relative humidity-sensitive material 30 and the relative humidity may be determined.

In some embodiments, polarized light may be used in a relative humidity sensor, which may increase the sensitivity of the sensor. An illustrative example is shown in FIG. 9.

Figure 9:
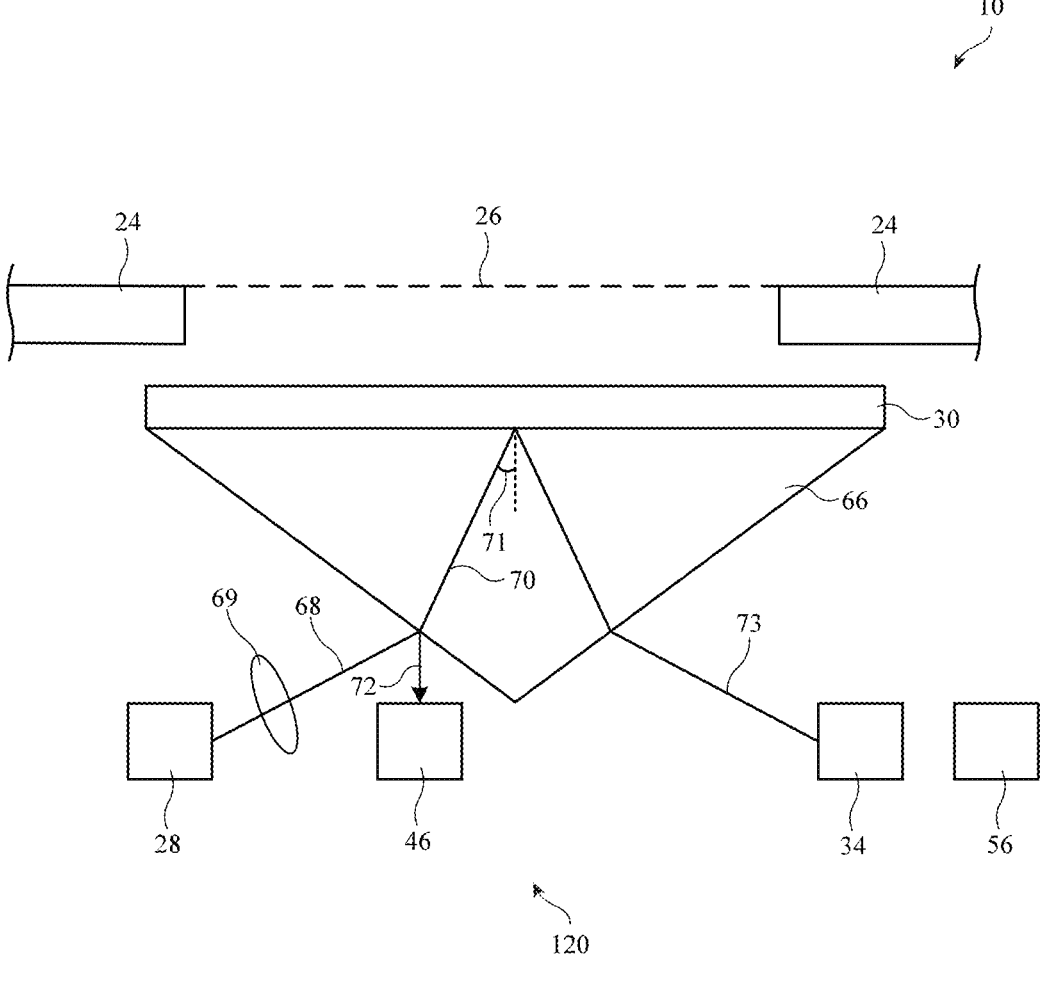
FIG. 9 is a side view of an illustrative electronic device with a relative humidity sensor formed from a prism and a collimated light source in accordance with some embodiments.

As shown in FIG. 9, relative humidity sensor 120 may include relative humidity-sensitive layer 30 on optical layer 66, which may be a prism. Light emitter 28 may emit light 68 through collimating lens 69. Light 68 may be transverse magnetic (TM) polarized light or may be light with another suitable polarization. Light 72 may be the reflected light off of optical layer 66 to reference light detector 46, while light 70 may enter optical layer 66. Light 70 may reflect from relative humidity-sensitive layer 30 at angle 71 and may reflect and exit optical layer 66 as light 73. Light detector 34 may detect light 73.

The reflection of relative humidity-sensitive layer 30 between the Brewster's angle and the total-internal-reflection (TIR) angle may be very sensitive to small changes due to the polarization and collimation of light 68. Therefore, light emitter 28 may be configured to emit light 68 so that light 70 hits relative humidity-sensitive layer 30 between the Brewster's angle and the TIR angle. In other words, angle 71 may be between the Brewster's angle and the TIR angle. As a result, any change to the relative humidity-sensitive layer 30 (e.g., the refractive index of layer 30) due to changes in the relative humidity may have a large impact on the reflectance off of layer 30, and the relative humidity may be determined based on the light detected by light detector 34. In other words, relative humidity sensor 120 may determine the relative humidity directly based on the light detected by light detector 34, or control circuitry (such as control circuitry 112 of FIG. 3) may be used to determine the relative humidity based on the light detected by light detector 34.

Sensor 120 may also include temperature sensor 56, which may be used to correct the determined relative humidity for changes to the relative humidity-sensitive layer 30 that occur due to temperature. If desired, light emitter 28, reference light detector 46, light detector 34, and/or temperature sensor 56 may be formed on the same control board, such as the same printed circuit board.

Instead of using collimated light as in FIG. 9, a refractometer may be used to measure light that has reflected at different angles based on changes to a relative humidity-sensitive layer. An illustrative example is shown in FIG. 10.

Figure 10:
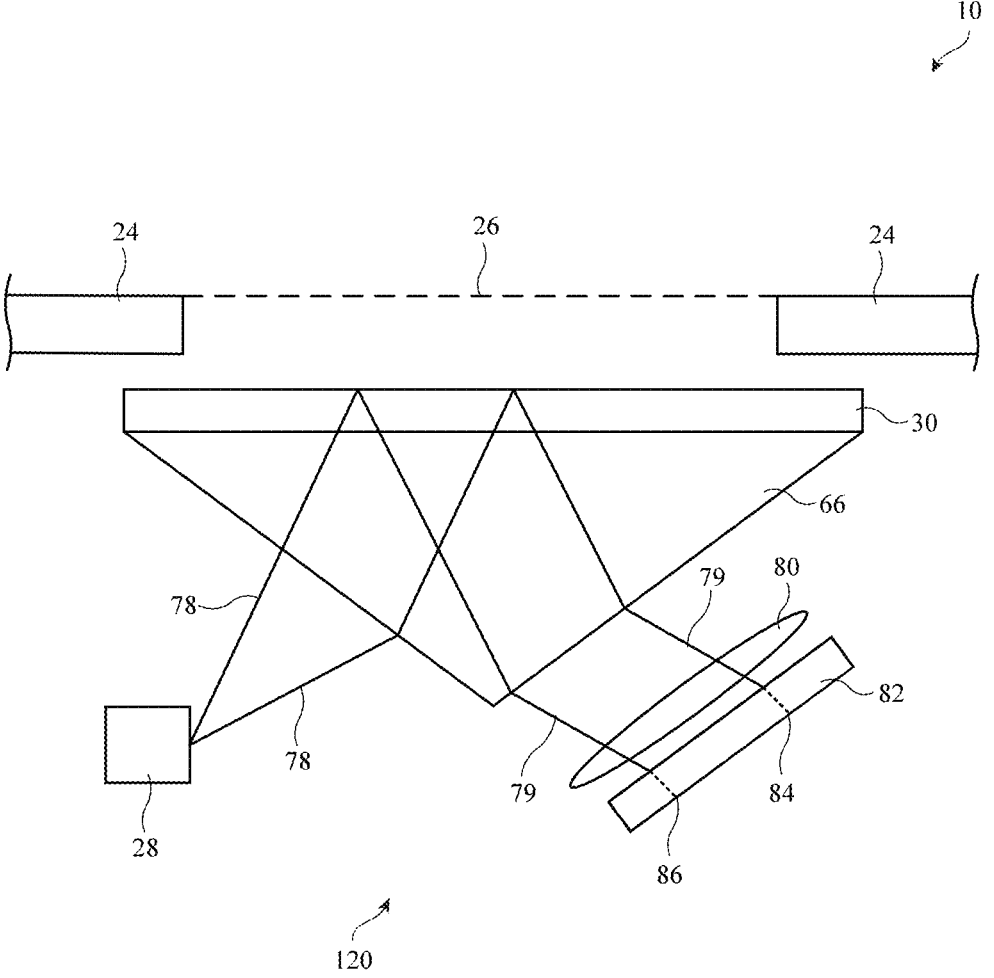
FIG. 10 is a side view of an illustrative electronic device with a relative humidity sensor formed from a prism and a diverging light source in accordance with some embodiments.

As shown in FIG. 10, light emitter 28 may emit light 78 into optical layer 66, which may be a prism. Unlike light 68 of FIG. 9, light 78 of FIG. 10 is uncollimated. Light 78 may reflect off of the interface between relative humidity-sensitive layer 30 and air as light 79. Light 79 may pass out of optical layer 66, and may be focused by lens 80 prior to being detected by line detector 82.

Because light 78 is divergent, uncollimated light, the light may reflect from layer 30 at a range of incident angles below and above the TIR angle. The spread of light reflected from layer 30 may change based on the refractive index of layer 30. For example, in the illustrative embodiment of FIG. 10, light 78 may illuminate a region of line detector 82 between line 84 and line 86. By determining how much of line detector 82 is illuminated (e.g., by detecting the angular spread of light detected by line detector 82), the refractive index of layer 30 may be determined, which may be used to determine the relative humidity. In this way, a refractometer formed using line detector 82 (or another suitable light detector), may be used to measure relative humidity. In other words, relative humidity sensor 120 may determine the relative humidity directly based on the measurement of line detector 82, or control circuitry (such as control circuitry 112 of FIG. 3) may be used to determine the relative humidity based on the measurement of line detector 82.

Although not shown in FIG. 10, a reference light detector and/or a temperature sensor may be incorporated into relative humidity sensor 120, if desired.

In some illustrative embodiments, integrated photonics may be used in combination with one or more relative humidity-sensitive layers to determine a relative humidity. An illustrative example of a relative humidity sensor that uses integrated photonics is shown in FIG. 11.

Figure 11:
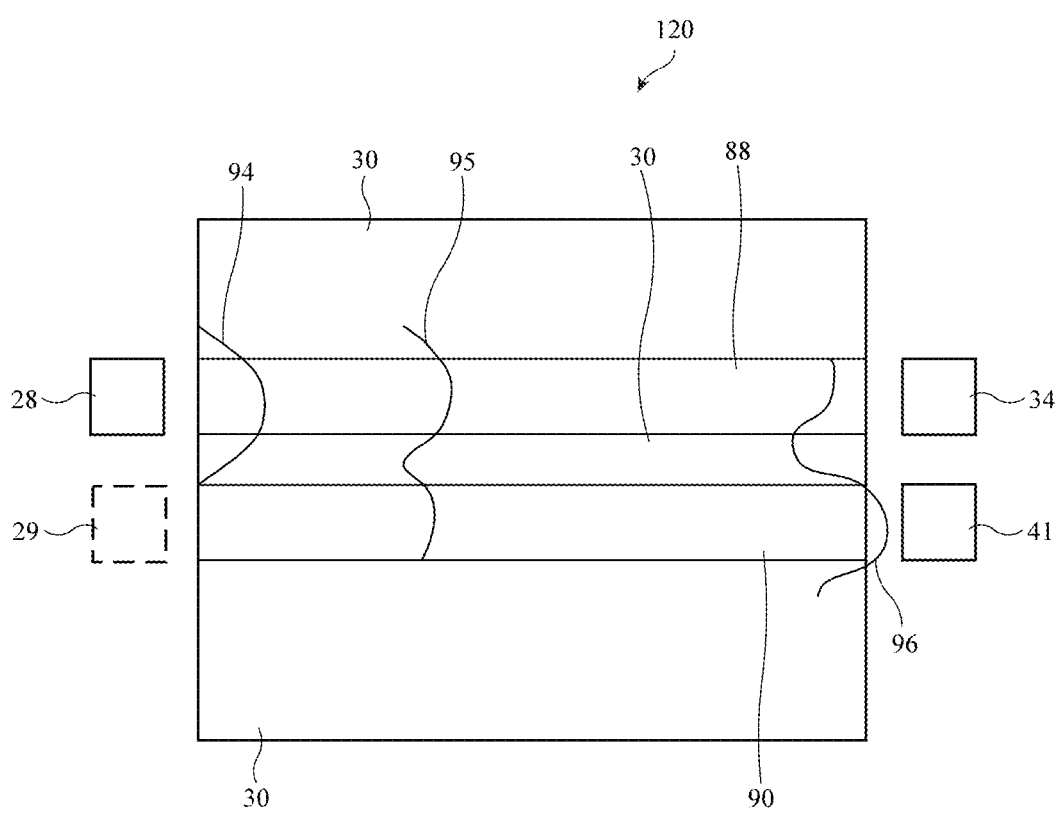
FIG. 11 is a side view of an illustrative electronic device with a relative humidity sensor formed from waveguides in accordance with some embodiments.

As shown in FIG. 11, relative humidity sensor 120 may include multiple optical layers, such as waveguides 88 and 90. Relative humidity-sensitive layer 30 may surround both of waveguides 88 and 90. Light emitter 28, which may be a laser source, may excite electromagnetic wave 94 in waveguide 88. Due to field coupling, the power of electromagnetic wave 94 may be exchanged from waveguide 88 to waveguide 90 as the electromagnetic wave moves through sensor 120. In particular, as shown by wave 95, some of the power has transferred to waveguide 90, and by the end of sensor 120, most, if not all, of the power has transferred to waveguide 90, as shown by wave 96.

A coupling length of the electromagnetic power in waveguides 88 and 90, which is respectively sensed by detectors 34 and 41, may be a function of relative humidity due to the presence of relative humidity-sensitive layers 30 on waveguides 88 and 90. Therefore, by measuring the amount of power that has shifted to waveguide 90 (using detectors 41 and 34), the relative humidity may be determined. In other words, relative humidity sensor 120 may determine the relative humidity directly based on the measurements of detectors 34 and 41, or control circuitry (such as control circuitry 112 of FIG. 3) may be used to determine the relative humidity based on the measurements of detectors 34 and 41.

If desired, optional light emitter 29, which may be a second laser source, may excite waveguide 90. Light emitter 29 may operate at the same wavelength as light emitter 28, or light emitters 28 and 29 may operate at different wavelengths. The electromagnetic power in waveguides 88 and 90 may be exchanged, and detectors may determine the amount of power that has been exchanged. Using two laser sources may allow sensor 120 to cover a larger relative humidity range, as an example.

Although FIG. 11 shows relative humidity-sensitive layers 30 on both sides of both waveguides 88 and 90, this is merely illustrative. In some embodiments, a single relative humidity-sensitive layer 30 may be incorporated between waveguides 88 and 90, while the upper surface of waveguide 88 and the lower surface of waveguide 90 may be free from relative humidity-sensitive material.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device having an interior and an exterior that is exposed to an environment, the electronic device comprising:
   a housing that separates the interior from the environment, wherein the housing has an opening; and
   a relative humidity sensor in the interior and exposed to the environment, wherein the relative humidity sensor comprises:
      an optical layer;
      a relative humidity-sensitive layer coupled to a surface of the optical layer;
      a light emitter configured to emit light into the optical layer; and
      a light detector configured to detect light that has reflected within the optical layer and off of the relative humidity-sensitive layer.

2. The electronic device of claim 1, wherein the relative humidity sensor further comprises:
   an absorptive coating on the relative humidity-sensitive layer, wherein the relative humidity-sensitive layer is interposed between the absorptive coating and the surface of the optical layer.

3. The electronic device of claim 2, wherein the relative humidity sensor is configured to determine a relative humidity based on an amount of the light detected by the light detector.

4. The electronic device of claim 3, wherein the optical layer has a first side and an opposing second side, the light emitter is configured to emit the light into the first side, and the light detector is adjacent to the second side.

5. The electronic device of claim 3, wherein the optical layer has a first side and an opposing second side, the light emitter is configured to emit the light into the first side, and the light detector is configured to detect the light at the first side, and the relative humidity sensor further comprises:
   a mirror coating on the second side.

6. The electronic device of claim 5, wherein the relative humidity sensor further comprises:
   a reference light detector and a temperature sensor adjacent to the first side of the optical layer.

7. The electronic device of claim 2, wherein the relative humidity sensor further comprises:
   a heater configured to dry the relative humidity-sensitive layer between relative humidity measurements.

8. The electronic device of claim 1, wherein the optical layer is a Bragg reflector that includes a stack of thin-film dielectric layers.

9. The electronic device of claim 8, wherein the relative humidity sensor further comprises:
   a reference Bragg reflector, wherein the light emitter is configured to emit additional light toward the reference Bragg reflector; and
   a reference light detector configured to detect light that has reflected from the reference Bragg reflector, wherein the relative humidity sensor is configured to determine a relative humidity by comparing a first measurement from the light detector and a second measurement from the reference light detector.

10. The electronic device of claim 8, wherein the light emitter is configured to emit the light at a first wavelength, and the relative humidity sensor further comprises:
   an additional light source configured to emit additional light at a second wavelength that is different from the first wavelength into the Bragg reflector, wherein the light detector is further configured to detect the additional light that has reflected within the Bragg reflector and off of the relative humidity-sensitive layer, and the relative humidity sensor is configured to determine a relative humidity by comparing the detected light and the detected additional light.

11. The electronic device of claim 8, wherein the light detector is configured to detect light at a first wavelength, the relative humidity sensor further comprises:
   an additional light detector configured to detect light at a second wavelength that is different from the first wavelength, wherein the relative humidity sensor is configured to determine a relative humidity by comparing the detected light at the first wavelength to the detected light at the second wavelength.

12. The electronic device of claim 1, wherein the optical layer is a prism, the relative humidity sensor further comprising:
   a collimating lens configured to collimate the light emitted by the light emitter; and
   a reference light detector configured to detect reflected light emitted from the light emitter that reflects off of an edge of the prism.

13. The electronic device of claim 12, wherein the relative humidity sensor is configured to determine a relative humidity based on an intensity of the detected light.

14. The electronic device of claim 1, wherein the optical layer is a prism, the light detector is a line detector, and the relative humidity sensor is configured to determine a relative humidity based on an angular spread of the light detected by the line detector.

15. The electronic device of claim 1, wherein the optical layer is a first waveguide, the light emitter is a laser configured to excite electromagnetic power within the first waveguide, the light detector is a first light detector configured to measure the electromagnetic power at an end of the first waveguide, and the relative humidity sensor further comprises:
   a second waveguide; and
   a second light detector configured to measure an additional electromagnetic power at an end of the second waveguide, wherein the relative humidity sensor is configured to determine a relative humidity based on the electromagnetic power at the end of the first waveguide and the additional electromagnetic power at the end of the second waveguide.

16. The electronic device of claim 1, wherein the relative humidity-sensitive layer comprises a film that includes voids and metal-oxide nanoparticles.

17. A relative humidity sensor, comprising:

an optical layer;

a relative humidity-sensitive layer on a surface of the optical layer;

a light emitter configured to emit light into the optical layer; and a light detector configured to detect light that has reflected within the optical layer and off of the relative humidity-sensitive layer, wherein the relative humidity sensor is configured to determine a relative humidity based on the detected light.

18. The relative humidity sensor of claim 17, wherein the optical layer comprises angled edges configured to direct the light emitted by the light emitter into the optical layer and to direct the light that has reflected within the optical layer out of the optical layer.

19. The relative humidity sensor of claim 18, wherein the optical layer is a prism.

20. An electronic device, comprising:

a housing;

a relative humidity sensor in the housing, wherein the relative humidity sensor comprises:

an optical layer;

a relative humidity-sensitive layer on a surface of the optical layer, wherein the relative humidity-sensitive layer is configured to exhibit a change in refractive index in response to relative humidity changes;

a light emitter configured to emit light into the optical layer; and a light detector configured to detect light that has reflected within the optical layer and off of the relative humidity-sensitive layer; and control circuitry that is configured to determine a relative humidity based on the light detected by the light detector.

* * * * *